United States Patent [19]
Knapp et al.

[11] 3,906,576
[45] Sept. 23, 1975

[54] RESILIENT ELEMENT FOR A BI-DIRECTIONAL PIG

[76] Inventors: Mary M. Knapp; Kenneth M. Knapp; Charles C. Knapp, Jr., all of 1209 Hardy, Houston, Tex. 77020

[22] Filed: July 9, 1973

[21] Appl. No.: 377,420

[52] U.S. Cl. .................................. 15/104.06 R
[51] Int. Cl. .................................. B08b 9/04
[58] Field of Search ........... 15/104.06 R, 104.06 A, 15/3.5, 3.51, 104.16, 104.3 R; 137/268

[56] References Cited
UNITED STATES PATENTS
3,480,984  12/1969  Kidd .......................... 15/104.06 R
3,704,478  12/1972  Vernooy ..................... 15/104.06 R FOREIGN PATENTS OR APPLICATIONS
547,897  4/1932  Germany ................... 15/104.06 R Primary Examiner—Edward L. Roberts
Attorney, Agent, or Firm—Donald Gunn

[57] ABSTRACT

For use in an assembled pipeline cleaning pig which is enabled to move in both directions, an element formed of resilient material which is preferably symmetrical about a transverse plane through the element wherein the element has an outer periphery which contacts against the wall of the pipe to be cleaned with a profile which includes an arc of curvature to thereby enable flexure of the resilient element to the right or left without altering the nature of contact against the pipe to be cleaned and without binding or otherwise snagging.

9 Claims, 5 Drawing Figures

US Patent  Sept. 23,1975  3,906,576
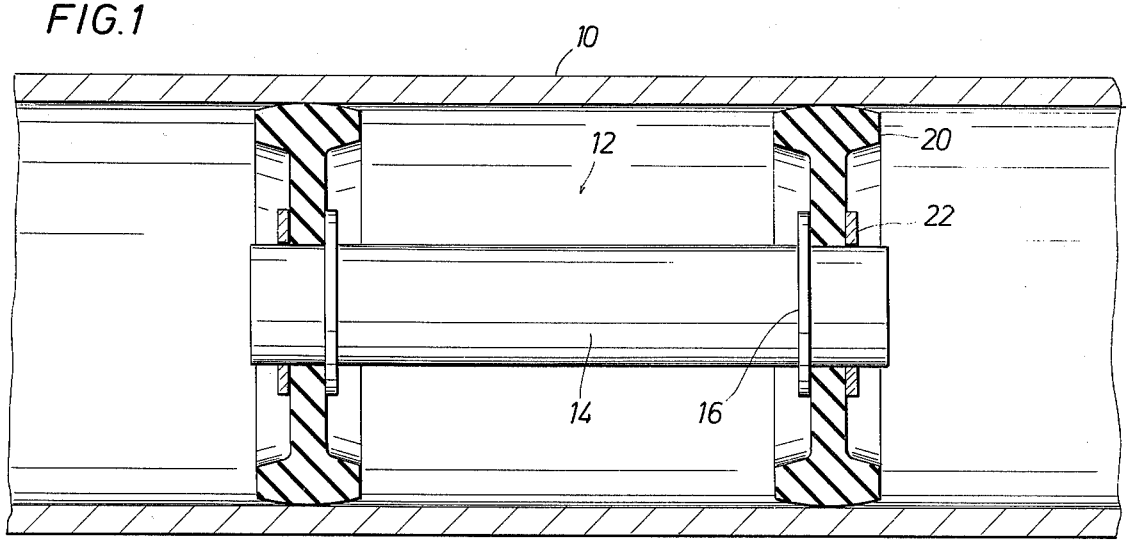
FIG.1
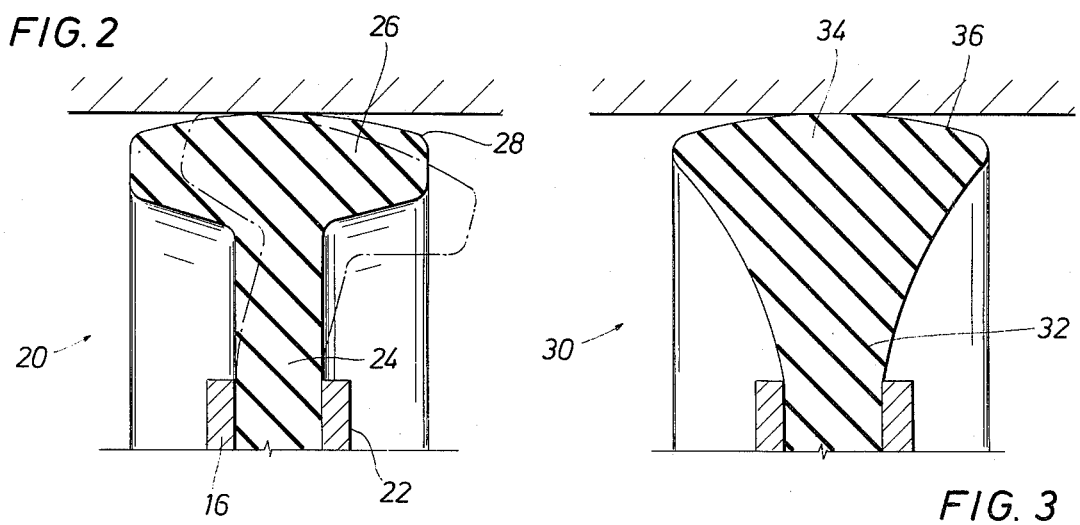
FIG.2
FIG.3
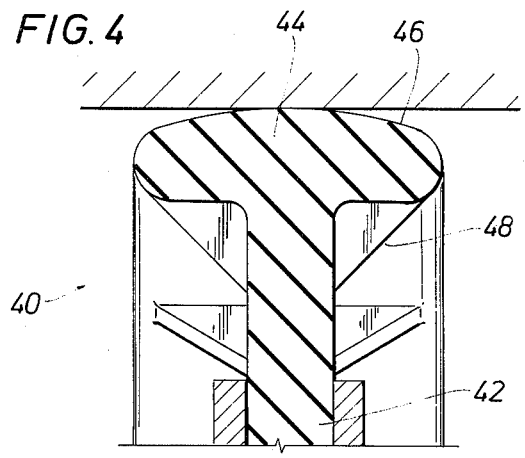
FIG.4
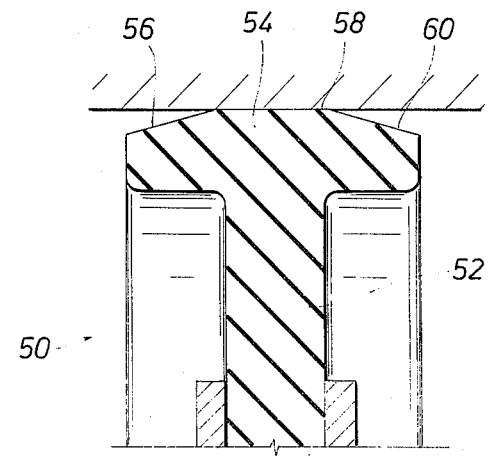
FIG.5

RESILIENT ELEMENT FOR A BI-DIRECTIONAL PIG

BACKGROUND OF THE INVENTION

Pipeline pigs are forced through the pipeline by pressure for the purpose of contacting the surrounding pipe and wiping it clean. They can be used to prevent paraffin accumulation on the wall of the pipe and to remove condensate which forms in natural gas lines. They also remove accumulations of extraneous matter.

In the treatment of pipelines, it is customary to utilize pipeline pigs which are either entirely resilient or built of resilient elements on a stiff central member. The present invention is intended as an improvement in these types of cleaning pigs. The present invention is a means which enables the pig to travel in both directions. In many pipelines, the flow always is in one direction such as in long pipelines which transfer crude oil. A particular pipeline only a few miles long may run between two specific petrochemical plants, or from a particular petrochemical plant to a group of storage tanks, and be exposed to bi-directional flow. Flow may be in one direction under a given set of circumstances, and in the opposite direction after some interval.

The possibility of bi-directional flow creates substantial problems for the handling of pipeline pigs, particularly for larger diameter pipelines. In the cleaning of a pipeline of approximately 2 feet in diameter or greater, pigs currently in use weigh several hundred pounds. The assembled pig over which the present invention improves is particularly heavy since it incorporates a central member of substantial structural strength. It has a central axial member which is usually formed of heavy gauge pipe or bar stock which adds a substantial amount of weight. After it has transversed the pipeline, it is difficult to trap or capture the pig, lift it out and turn 180° for subsequent transfer through the pipeline in the opposite direction. This requires opening and closing of many valves and the manipulation of other equipment including a chain hoist and the like.

The present invention provides a wiping element formed of resilient material which can be used with a fabricated pipeline pig wherein bi-directional travel of the pig is permissible. The present invention is particularly suitable for use in larger diameter pipelines where the substantial pig weight and the difficulty of handling a unidirectional pig become prohibitive.

SUMMARY OF THE PRESENT INVENTION

The preferred embodiment of the present invention defines a resilient cup for use in a bi-directional pig. The cup is placed on a stiff axial member and is symmetrical about a transverse plane. The outer periphery of the cup which contacts the pipe to be cleaned is preferably formed in one embodiment along a radius equal to the radius of the pipeline. The pig is preferably fabricated including a flange which extends equally on both sides of the transverse plane therethrough. Alternative embodiments disclosed include one wherein the periphery of the resilient member is formed of straight line segments which approximate the same curvature. Another embodiment incorporates reinforcing gussets on the inboard side of the flange.

BRIEF DESCRIPTION OF THE DRAWINGS

FIG. 1 is a sectional view of a fabricated pig utilizing resilient cups, showing the pig in a pipeline;

FIG. 2 is an enlarged sectional view through a resilient rubber cup;

FIG. 3 shows an alternative embodiment to that of FIG. 2 wherein the rubber cup is made somewhat stiffer;

FIG. 4 shows an embodiment similar to FIG. 2 wherein the external flange is strengthened by the addition of reinforcing gussets spaced about its internal circumference; and, FIG. 5 shows an alternative embodiment to FIG. 2 wherein the periphery approximates the curvature of FIG. 2 through the use of straight line segments as shown in sectional view.

DESCRIPTION OF THE PREFERRED EMBODIMENTS

Attention is first directed to FIG. 1 where a pipe 10 and an assembled pig 12 are shown. The pig 12 preferably incorporates a central axial member 14 of substantial strength. The member 14 normally supports two or more resilient cups. The cups can be positioned at each end and additional cups can be located along the center. The stiff member 14 can vary in construction, size, length and many other details. It preferably incorporates means for mounting resilient cups. Such a means includes an external collar 16 which is adapted to abut a cup 20 which is captured on the pig by means of a second encircling collar 22. The collars 16 and 22 lock the pig 20 in position by tack welding or they can be bolted to the body 14. They also can be anchored in position by means of radially, inwardly directed lock pins or many other techniques. It is sufficient to note that the present invention discloses a cup which is adapted to be used with a fabricated pig as shown in FIG. 1 without regard to details of construction of the pig 12.

Attention is next directed to FIG. 2 where a resilient cup 20 is shown in greater detail which incorporates two portions. The first portion is the central webbing portion which is generally indicated by the numeral 24 and lies in a common plane and has radial extent less than the pipe 10 in which the pig is positioned. Preferably, the central webbing material 24 is hollow at a central point to enable the rubber cup to be placed over the elongate stiff member 14 around which the pig is fabricated. The resilient cup thus is formed of a central webbing material of adequate thickness. The thickness might range from about one inch for a cup intended in the range of 10 to about 16 inches to a webbing of about an inch and a half thickness for pigs in the range of 16 to 24 inches in diameter. The central web member 24 is formed of a resilient material, preferably polyurethane. It is normally formed in thicknesses of the above mentioned range and in hardnesses ranging from about 40 to 80 durometer.

The web 24 extends outwardly to a symmetrical flange 26 which is preferably symmetrical about a central plane through the center line of FIG. 2. In other words, the flange 26 is provided in mirror image arrangement on both the left and right sides of the web material 24. The flange 26 is formed with a curved outer face. FIG. 2 is a sectional cut through the pig. Hence, the rubber cup of the present invention resembles a slice out of a sphere which has a radius equal to the nominal internal diameter of pipe 10. If the internal diameter of the pipe is 24 inches, then the diameter of the resilient cup of the present invention is likewise 24 inches and the surface 28 constitutes a sliced portion from a sphere of such a diameter.

Attention is next directed to FIG. 3 of the drawings where an alternative embodiment is indicated by the numeral 30. It incorporates a central web portion 32 which becomes thicker towards the outer periphery. The central web portion 32 extends to an outer flange 34 which has an outer surface 36 shaped in the same manner as the outer surface of the flange 26 described with respect to FIG. 2. The outer surface 36 is a portion of a sphere having a radius equal to the radius of the pipeline to be cleaned. The outer surface 36 provides a comparable width. The embodiment 30 shown in FIG. 3 tends to be somewhat stiffer because it has added material between the flange and central web portion 32. It is preferably smoothly faired or curved into the edges of the outer flange. The exact radius of curvature is not critical.

Attention is next directed to FIG. 4 where another embodiment is indicated by the numeral 40 which incorporates a central web portion 42 similar to that illustrated in FIG. 2. An outer flange 44 is likewise incorporated. The outer flange has an outer surface 46 which is preferably of the same curvature and approximately the same width as illustrated with respect to the embodiments 20 and 30 previously described.

The outer surface 46 is similar to the outer surfaces on the other embodiments in curvature, width and in other details. The embodiment 40 in FIG. 4 also adds reinforcing gussets 48. The reinforcing gussets are preferably approximately formed as an isosceles triangle, are relatively thin, perhaps one fourth inch thick or larger, and are spaced every 3 or 4 inches about the periphery of the flange.

FIG. 5 discloses an additional embodiment indicated by the numeral 50. The numeral 52 identifies the web material while the numeral 54 identifies the flange. The flange 54 has an outer surface formed of three encircling segments indicated at 56, 58, and 60, shown in sectional view as being straight line segments. The segments 56, 58 and 60 jointly approximate the curved outer surface found on the embodiments 20, 30 and 40. However, the segmental outer surface illustrated in FIG. 5, functions quite well and requires somewhat simpler molding techniques. The embodiment 50 preferably has the same width of flange as that illustrated in the other embodiments. The flange could be even wider but there is no particular gain in making it wider. It can be formed of five segments to obtain a closer approximation to the arc of curvature shown in the other embodiments but this is not necessarily beneficial.

The embodiment 50 is worn on the points and tends to wear into a shape or pattern more nearly resembling the rounded shapes shown in FIGS. 2, 3 and 4. In other words, the corners between the illustrated segments are worn away. The embodiment 50 is shown in FIG. 5 in a rest position and is shown when the resilient cup is stationary in the pipeline. When the pig is moving in either direction, the web material 52 deflects slightly and bends or flexes so that the face 58 is canted with respect to the pipe wall and thereby forces one of the two lines of intersection against the outer wall in a manner tending to wear it away and thereby rounding the straight line segments into a curvature.

In operation, the rubber cups are installed on the pig member 14 for use in a pipeline. The assembled pig can be forced through the pipeline in either direction. Referring momentarily to FIG. 2, the dotted line position approximates the deflection occurring during translation from right to left as viewed in FIG. 2. There is a tendency for the flange to drag on the wall of the pipe and hence, it is bent to the side as illustrated in FIG. 2. This occurs all around the periphery of the rubber cup. It will be observed in FIG. 2 that the pig maintains its contact with the wall of the pipe to continue the sealing and cleaning operation required of the pig. The deflection of the flange about the web evenly distributes the wear which occurs. The outer face 28 is more evenly worn as a result of the continuing bending and flexing of the flange to different points of contact.

The embodiment 20 can be translated through the pipeline in the opposite direction, thereby bending the flange oppositely from that illustrated in FIG. 2. Again, a line of contact is maintained which enables the rubber cup to continue its customary operation. No particular problem arises from translation of the rubber cup to the right or to the left. The apparatus is able to accommodate such reversals of direction.

The other embodiments are also able to be translated through a pipeline in either direction. A bi-directional pig is provided by the present invention which utilizes the rubber cups to function bi-directionally.

The foregoing constitutes a description of the preferred embodiments but the scope is determined by the claims which are as follows.

We claim:

1. A resilient cup for use in a pipeline pig which enables the pig to move bi-directionally in a pipeline wherein the cup is adapted to be joined to a pipeline pig body comprising a central web portion having means which is adapted to engage a pipeline pig body wherein the central web portion extends radially outwardly and lies in a common plane generally perpendicular to the length of the pipeline pig body, a flange on the outer end of said web portion, said flange being symmetrically arranged on both sides of the aforementioned plane and having an outer surface on said flange which is adapted to contact and clean the inner wall of a pipeline wherein the outer surface is not parallel to the inner wall of such a pipeline and wherein said central web is flexible and able to bend such that said outer flange bends on both side of the aforementioned plane while maintaining the outer surface thereof in a position to be contacted against a pipeline to be cleaned.

2. The invention of claim 1 wherein the outer surface of the outer flange includes an arc having a radius equal to the nominal internal diameter of the pipeline.

3. The invention of claim 2 wherein said flange is perpendicular to said web.

4. The invention of claim 2 wherein the center for the radius coincides with the centerline of the pipe to be cleaned.

5. The invention of claim 2 wherein said central web increases gradually in thickness from the center outwardly.

6. The invention of claim 2 wherein said central web is of uniform thickness.

7. The invention of claim 6 including reinforcing gussets between said central web and said flange on both sides of said central web.

8. The invention of claim 7 wherein said gussets are spaced around said flange at specified locations.

9. The invention of claim 1 wherein said outer surface is formed of line segments which together define an arcuate surface as viewed in section.

* * * * *